United States Patent
Abramsohn

(10) Patent No.: US 7,292,603 B2
(45) Date of Patent: Nov. 6, 2007

(54) MEMORY-EFFICIENT CONVERSION BETWEEN DIFFERING DATA TRANSPORT FORMATS OF SONET OVERHEAD DATA

(75) Inventor: Walter Abramsohn, San Jose, CA (US)

(73) Assignee: Exar Corporation, Fremont, CA (US)

( * ) Notice: Subject to any disclaimer, the term of this patent is extended or adjusted under 35 U.S.C. 154(b) by 1023 days.

(21) Appl. No.: 10/356,205

(22) Filed: Jan. 31, 2003

(65) Prior Publication Data

US 2004/0151207 A1 Aug. 5, 2004

(51) Int. Cl.
*H04J 3/22* (2006.01)

(52) U.S. Cl. .................. 370/474; 370/466

(58) Field of Classification Search ............ 370/474, 370/466
See application file for complete search history.

(56) References Cited

U.S. PATENT DOCUMENTS

| | | | |
|---|---|---|---|
| 5,134,614 A * | 7/1992 | Baydar et al. | 370/522 |
| 6,628,651 B1 * | 9/2003 | Ryan et al. | 370/369 |
| 6,983,414 B1 * | 1/2006 | Duschatko et al. | 714/782 |
| 2002/0172227 A1 * | 11/2002 | Varelas et al. | 370/514 |

* cited by examiner

*Primary Examiner*—Brian Nguyen
(74) *Attorney, Agent, or Firm*—Townsend and Townsend and Crew

(57) ABSTRACT

In a SONET apparatus, the data flow differences between OC-768 and OC-192 can be exploited to effectuate conversion between OC-768 and OC-192 using as little as 256 bytes of memory.

42 Claims, 2 Drawing Sheets

64 BYTES, 16 CLOCKS

MEMORY-EFFICIENT CONVERSION BETWEEN DIFFERING DATA TRANSPORT FORMATS OF SONET OVERHEAD DATA

FIELD OF THE INVENTION

The invention relates generally to time division multiplexed (TDM) data communications and, more particularly, to low rate processing of overhead data carried in data channels of a high rate TDM data stream.

BACKGROUND OF THE INVENTION

In conventional SONET systems, an OC-768 frame is composed of 4 OC-192 frames that are time division multiplexed 64 bytes at a time. This is illustrated in FIG. 1, wherein 64 byte portions, or slices, of four OC-192 frames 1, 2, 3 and 4 are time division multiplexed. The overhead bytes of the multiplexed frames are usually dropped in a 32 bit bus in OC-768 mode. The overhead bytes of an OC-768 mode frame are dropped in the form of sixteen 32-bit words from each OC-192 channel. Most of the logic currently available to process the overhead bytes is intended to be used with OC-192 frames. Accordingly, the overhead bytes of OC-768 frames are typically processed as 4 independent OC-192 frames. This requires demultiplexing the OC-768 frame into its 4 constituent OC-192 frames before the overhead processing, and then multiplexing the 4 constituent OC-192 frames back into the OC-768 frame after overhead processing.

FIG. 2 diagrammatically illustrates an example of a conventional arrangement for converting between OC-768 and OC-192 to permit OC-192 overhead drop/add processing. The arrangement of FIG. 2 utilizes two dual port memories 11 and 15, each having a capacity of 768×N×8×2 bits. Each of the dual port memories stores two entire frames of overhead bytes, where N is 27 for transport overhead (TOH) bytes only, and where N is 36 when all overhead bytes are processed. The dual port memory 11 is divided into first and second portions and, while the overhead bytes for an entire OC-768 frame are written into the first portion of the memory 11, overhead bytes previously written into the second portion of the memory 11 are read out and input to 4 individual OC-192 overhead processing channels shown generally at 13. The dual port memory at 15 is also divided into first and second portions so that the overhead bytes received from the overhead processing channels 13 can be written into the first portion of the memory 15 while overhead bytes previously received from channels 13 and stored in the second portion of the memory 15 are read out and loaded into the output register R2. Thus, data is written to and read from the dual port memory 11 in order to convert from OC-768 to OC-192, and data is written to and read from the dual port memory 15 in order to convert from OC-192 back to OC-768. The outputs of the overhead drop/add processing channels 13 are 9 bits wide in this example because each of the channels adds the conventional ADD_EN bit.

Because each of the dual port memories 11 and 15 is required to store the overhead bytes from two entire OC-768 frames, the FIG. 2 arrangement is quite costly in terms of its memory size requirements. It is therefore desirable to reduce the memory size requirements associated with the OC-768/OC-192 conversions that are required to permit OC-192 processing of the overhead bytes from OC-768 frames.

Exemplary embodiments of the present invention can, for any given OC-192 channel, exploit the data flow differences between OC-768 and OC-192 to effectuate conversion between OC-768 and OC-192 using as little as 256 bytes of memory.

DETAILED DESCRIPTION

Figure 2:
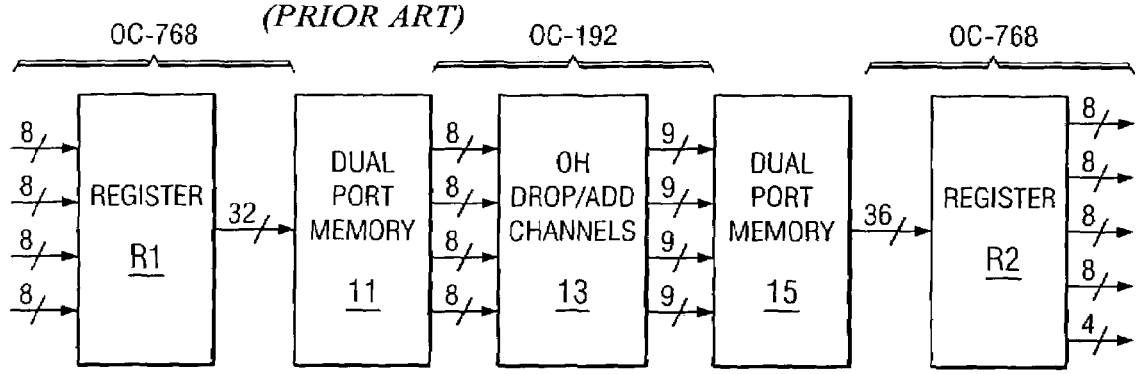
FIG. 2 diagrammatically illustrates an example of a prior art arrangement for permitting the overhead bytes of an OC-768 frame to be processed in individual OC-192 overhead processing channels.
Figure 3:
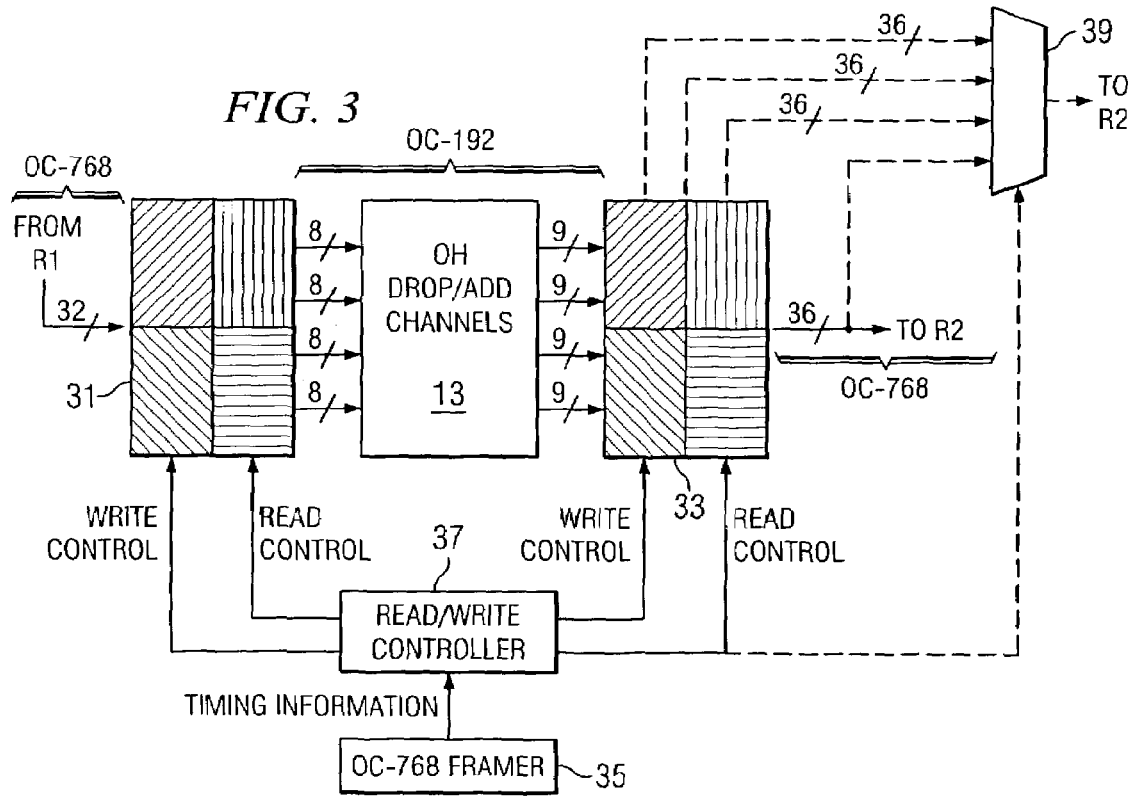
FIG. 3 diagrammatically illustrates exemplary embodiments of an overhead processing apparatus according to the invention for permitting the overhead bytes of an OC-768 frame to be processed in individual OC-192 overhead processing channels.

FIG. 3 diagrammatically illustrates exemplary embodiments of an apparatus for processing overhead bytes from OC-768 frames. The apparatus of FIG. 3 utilizes a dual port memory apparatus 31 (drop side memory) to convert the overhead bytes from the OC-768 format to the OC-192 format in order to permit processing by OC-192 overhead processing channels 13. A further dual port memory apparatus 33 (add side memory) then converts the OC-192 formatted overhead bytes produced by the overhead processing channels 13 back into OC-768 format. The dual port memory 31 receives the 32-bit output from the conventional register R1 of FIG. 2, and is controlled in such a manner that only 4 consecutive 64 byte slices from FIG. 1 need be stored in dual port memory 31 at any given time. The shading in the dual port memory 31 designates the areas in which the correspondingly shaded 64 byte slices from FIG. 1 are stored in the dual port memory 31.

Figure 1:
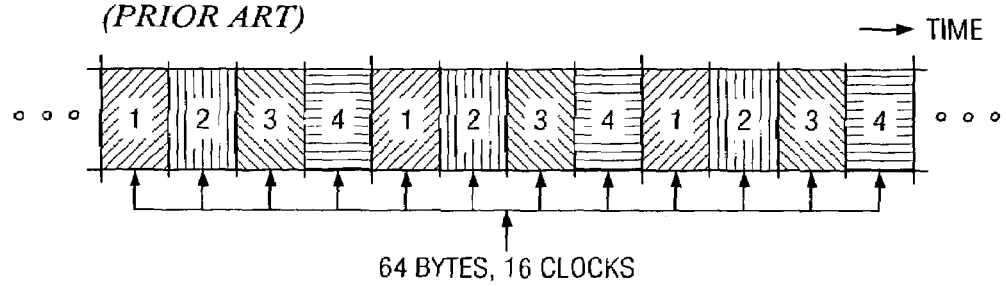
FIG. 1 is a timing diagram which illustrates a conventional OC-768 channel.

The 64 byte slices of FIG. 1 can be written consecutively into memory apparatus 31. Each 64 byte slice is written into its corresponding area of the memory apparatus, 4 bytes (32 bits) at a time. As soon as the first 4 bytes of a given slice are written into the memory apparatus 31, the bytes of that slice can begin to be read out of the memory apparatus one byte at a time for feeding into the corresponding overhead drop/add processing channel 13. Because each 64 byte slice is written into the memory apparatus 4 bytes at a time, the process of writing a given 64 byte slice into the memory apparatus 31 requires 16 clock cycles (4 bytes×16 clock cycles=64 bytes). After a 64 byte slice of OC-192 channel 1 (see also FIG. 1) is written into the memory apparatus 31, then the immediately following 64 byte slice of OC-192 channel 2 is written into the memory, after which the 64 byte slices of OC-192 channels 3 and 4 are written into the memory 31. Thus, every 64 clock cycles, the 16 clock cycle process of writing the next 64 byte slice of a given channel begins. On the other hand, the process of reading the 64 bytes of a given channel out of the memory apparatus 31 one byte at a time requires 64 clock cycles. Therefore, all 64 bytes of each slice of a given channel can be read out from the memory apparatus 31 before they are overwritten by the next 64 byte slice.

Figure 4:
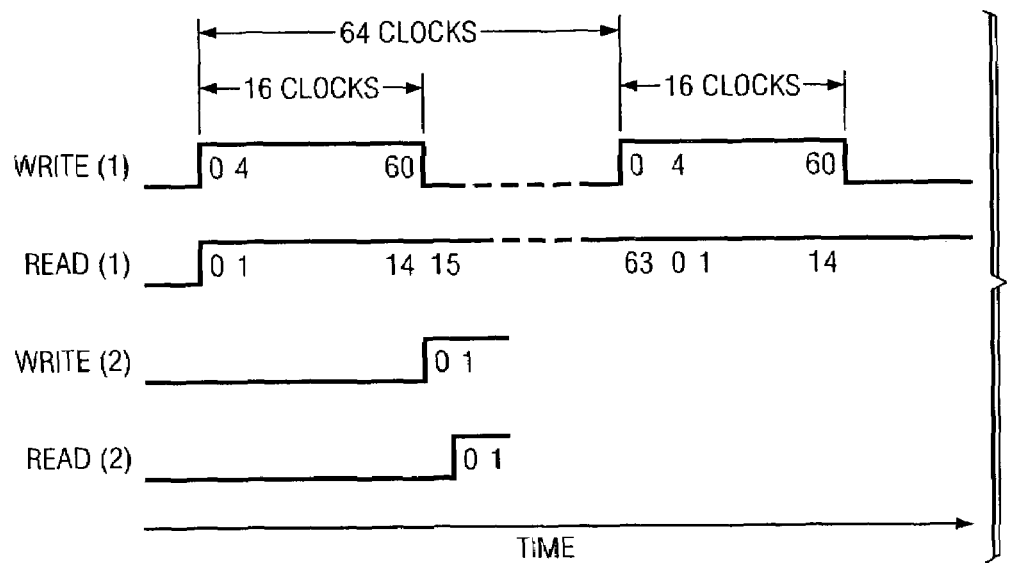
FIG. 4 is a timing diagram which illustrates exemplary read and write operations of the drop side memory of FIG. 3.

A read/write controller 37 receives, from a conventional OC-768 framer 35, conventional timing information including, for example, OC-768 clock signals and frame, row and column start signals. In response to this information, the read/write controller 37 produces write control signals and read control signals for controlling the write and read operations of the dual port memory apparatus 31. FIG. 4 illustrates an example of how these read and write control signals can control the read and write operations of the dual port memory 31. In FIG. 4, the signal Write(1) represents the operation of writing the 64 byte slices corresponding to OC-192 channel 1 into the memory apparatus 31, and the signal Read(1) represents the operation of reading the bytes of OC-192 channel 1 out of the memory apparatus 31. The signals Write(2) and Read(2) respectively represent the write and read operations for the bytes of OC-192 channel 2.

As shown in FIG. 4, and as discussed above, a 64 byte slice from OC-192 channel 1 is written into the memory apparatus 31 by a series of 16 consecutive 4 byte write operations. After the first 4 byte write operation, the process of reading out the bytes of OC-192 channel 1 begins. The $64^{th}$ byte (byte 63) is read out of the memory apparatus 31 at the same time as the first 4 bytes (bytes 0-3) of the next 64 byte slice of OC-192 channel 1 are being written into the memory.

During the next clock cycle after the $16^{th}$ (and final) 4 byte write operation for the current slice of channel 1 has been completed, the first 4 byte write operation for channel 2 begins, and after this first 4 byte write operation for channel 2 has been completed, the process of reading out the channel 2 bytes, one byte at a time, begins, as illustrated in FIG. 4. Although not explicitly shown in FIG. 4, the first 4 byte write operation for channel 3 begins on the next clock cycle after completion of the last 4 byte write operation for channel 2, and the first 4 byte write operation for channel 4 begins on the next clock cycle after completion of the last 4 byte write operation for channel 3. For each channel, the process of reading the bytes of a given slice out of memory apparatus 31, one byte at a time, begins during the clock cycle immediately following the first 4 byte write operation for that slice. In this manner, the 64 byte slices for each channel are consecutively written into corresponding portions of the memory apparatus 31, 4 bytes at a time, and the bytes can be read out of the corresponding memory portions one byte at a time, without any of the bytes of a given 64 byte slice being overwritten by the next 64 byte slice for that channel.

At the output side of the overhead drop/add channels 13, the output byte stream for channel 2 will trail the output byte stream for channel 1 by 16 clocks, and the stream for channel 3 will trail the stream for channel 2 by 16 clocks, and the stream for channel 4 will trail the stream for channel 3 by 16 clocks. These 16-clock offsets correspond to the 16-clock TDM channel periods shown in FIG. 1, and the offsets are also exhibited from channel to channel as the bytes are read out from memory apparatus 31 and input to the corresponding overhead processing channels 13 (see, e.g., the 16 clock offset between signals Read(1) and Read(2) of FIG. 4). Also note that the overhead processing channels 13 can add an additional bit corresponding to the conventional ADD_EN bit, for a total output of 9 bits per channel. For convenience of description, these 9 bit output units will be referred to as "bytes" in the discussion of memory apparatus 33. For each channel, the output bytes are read into the corresponding portion of memory apparatus 33 (see shading in FIGS. 1 and 3) one byte at a time. After enough bytes have been written into the corresponding section of memory, the read operation can begin to read out the bytes to register R2, 4 bytes at a time.

Figure 5:
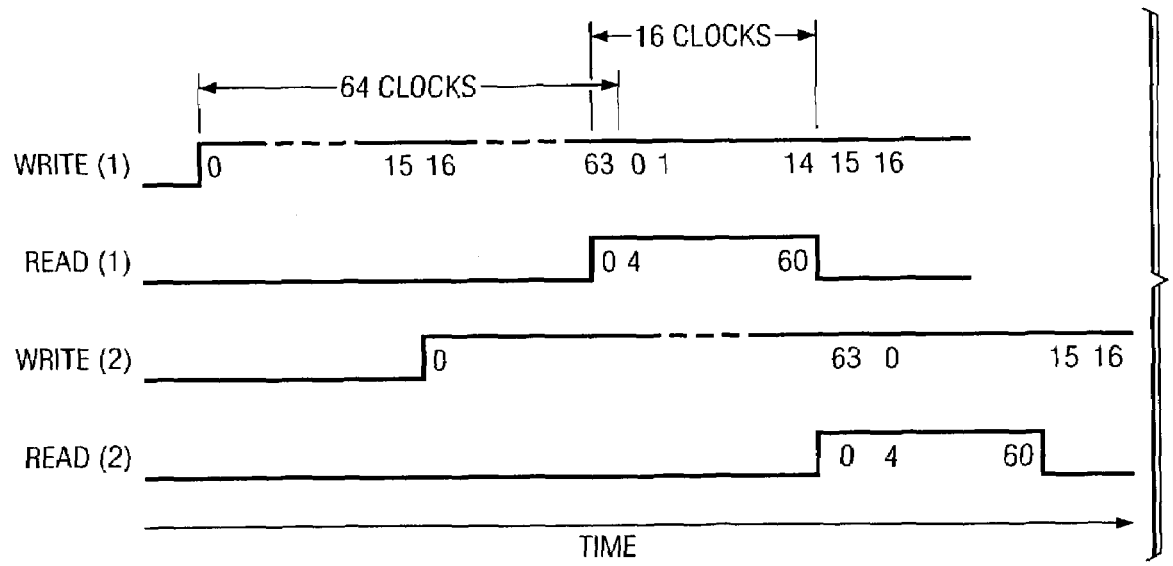
FIG. 5 is a timing diagram which illustrates exemplary read and write operations of the add side memory of FIG. 3.

In the example of FIG. 5, the signals Read(1), Read(2), Write(1) and Write(2) represent read and write operations for OC-192 channels 1 and 2 with respect to memory 33. During the same clock cycle that the $64^{th}$ byte (byte 63) of the current channel 1 slice is written into the memory 33, the first 4 bytes (for example bytes 0-3) thereof are read out of the memory 33. The remaining 60 bytes of the current channel 1 slice are read out of the memory during the next 15 clock cycles, and the read operation for the last 4 bytes (bytes 60-63) is completed simultaneously with the writing of byte 14 of the next slice of channel 1. Then, the process repeats itself, such that, while byte 63 of the next channel 1 slice (not shown in FIG. 5) is being written into the memory apparatus 33, bytes 0-4 of that channel 1 slice are being read out from memory apparatus 33 (also not shown).

After the first 16 bytes (bytes 0-15) of the channel 1 slice are written into the memory apparatus 33, the first byte (byte 0) of the channel 2 slice is written into the memory apparatus 33 simultaneously with the writing of the $17^{th}$ byte (byte 16) of channel 1, as shown in FIG. 5. As with channel 1 above, during the same clock cycle that byte 63 of the current channel 2 slice is written into the memory apparatus 33, bytes 0-3 of the current channel 2 slice are read out from memory 33. Although channels 3 and 4 are not illustrated in FIG. 5, the read and write operations thereof with respect to memory 33 are performed analogously to those illustrated for channels 1 and 2, and will be readily apparent to workers in the art.

The write control signals and read control signals that control the operation of memory apparatus 33 are produced by the read/write controller 37 in response to the aforementioned timing information received from the conventional OC-768 framer 35. These read and write control signals, as well as the read and write control signals for memory 31, are readily produced by logic in controller 37 based on the timing information conventionally available from the OC-768 framer 35.

The foregoing description makes clear that the dual port memories 31 and 33 of FIG. 3 can be significantly smaller than the dual port memories 11 and 15 of the conventional structure in FIG. 2. In fact, the dual port memories 31 and 33 of FIG. 3 each require only a 256 byte capacity (with a 9-bit "byte" where the ADD_EN bit is utilized on the add side, as described above).

In some exemplary embodiments, one or both of the dual port memories 31 and 33 are implemented as four separate 64×8 bit FIFO memories, one for each channel. If the memory apparatus 33 is implemented by such a FIFO arrangement, then the separate outputs of the separate FIFOs can be input to a selector 39 under control of the add side memory read control signaling from the read/write controller 37. Thus, during a given FIFO's read cycle, that FIFO can be selected for connection to the output register R2. The select input, the data inputs. (corresponding to four separate FIFO outputs), and the output of selector 39 are shown by broken line in FIG. 3.

Although exemplary embodiments of the invention are described above in detail, this does not limit the scope of the invention, which can be practiced in a variety of embodiments.

What is claimed is:

1. A method of processing overhead data bytes from SONET data frames, comprising:
receiving during a predetermined period of time a data frame having a first data format, said data frame comprising a plurality of groups of overhead data bytes, each said group carrying overhead information associated only with a respectively corresponding one of a plurality of SONET data frames;

converting, while said data frame is received, said plurality of groups of overhead data bytes from said first data format into a second data format; and said converting step including, for one of said groups, storing a predetermined number of said overhead data bytes thereof respectively into a plurality of storage locations equal in number to said predetermined number at a first data rate;

said converting step further including obtaining, at a second data rate, said predetermined number of said overhead data bytes from said plurality of storage locations; and said converting step further including storing a further said predetermined number of said overhead data bytes of said one group respectively into said plurality of storage locations at said first data rate, wherein said first and second data rates are determined such that said overhead data bytes of said one of said groups are concurrently stored into and obtained from said plurality of storage locations during said predetermined period of time.

2. The method of claim 1, wherein said SONET frames are OC-192 frames.

3. The method of claim 1, wherein said first data format is a time division multiplexed data format.

4. The method of claim 3, wherein said SONET frames are OC-192 frames, and wherein said time division multiplexed data format is OC-768.

5. The method of claim 4, wherein said predetermined number is 64.

6. The method of claim 4, wherein, in said second data format, said groups of overhead data bytes that respectively correspond to OC-192 frames are arranged in parallel with one another.

7. The method of claim 3, wherein, in said second data format, said groups of overhead data bytes are arranged in parallel with one another.

8. The method of claim 1, wherein, in said first data format, respective portions of said groups of overhead data bytes are time division multiplexed with one another.

9. The method of claim 8, wherein, each of said portions consists of said predetermined number of bytes.

10. The method of claim 1, wherein, in said second data format, said groups of overhead data bytes are arranged in parallel with one another.

11. The method of claim 1, wherein said converting step includes, for each of the remainder of said groups:

storing said predetermined number of said overhead data bytes of said group respectively into a plurality of storage locations associated with said group and equal in number to said predetermined number;

obtaining said predetermined number of said overhead data bytes of said group from the associated storage locations; and after said last-mentioned obtaining step, storing a further said predetermined number of said overhead data bytes of said group respectively into the associated storage locations.

12. The method of claim 1, wherein, in said first data format, said groups of overhead data bytes are arranged in parallel with one another.

13. The method of claim 12, wherein said second data format is a time division multiplexed data format.

14. The method of claim 13, wherein said SONET frames are OC-192 frames, and wherein said time division multiplexed data format is OC-768.

15. The method of claim 14, wherein said predetermined number is 64.

16. The method of claim 14, wherein, in said first data format, said groups of overhead data bytes that respectively correspond to OC-192 frames are arranged in parallel with one another.

17. The method of claim 1, wherein said second data format is a time division multiplexed data format.

18. The method of claim 1, wherein, in said second data format, respective portions of said groups of overhead data bytes are time division multiplexed with one another.

19. The method of claim 18, wherein, each of said portions consists of said predetermined number of bytes.

20. An apparatus for processing overhead data bytes from SONET data frames, comprising:

an input for receiving during a predetermined period of time a data frame having a first data format, said data frame comprising a plurality of groups of overhead data bytes, each said group carrying overhead information associated only with a respectively corresponding one of a plurality of SONET data frames; and a converter coupled to said input for converting, while said data frame is received, said plurality of groups of overhead data bytes from said first data format into a second data format, said converter including a memory having a plurality of storage locations, said memory operable with respect to one of said groups for storing a predetermined number of said overhead data bytes of said one group respectively into a number of said storage locations equal to said predetermined number at a first data rate, said memory for outputting said predetermined number of overhead data bytes from said predetermined number of storage locations at a second data rate, and said memory further operable, after having output said predetermined number of overhead data bytes, for storing a further said predetermined number of said overhead data bytes of said one group respectively into said predetermined number of storage locations at said first data rate, wherein said first and second data rates are determined such that said overhead data bytes of said one of said groups are concurrently stored into and obtained from said plurality of storage locations during said predetermined period of time.

21. The apparatus of claim 20, wherein said memory is further operable with respect to each of the remainder of said groups for: (a) storing said predetermined number of said overhead data bytes of said group respectively into further said storage locations associated with said group and equal in number to said predetermined number; (b) outputting said predetermined number of overhead data bytes of said group from the associated storage locations; and (c) after having output said predetermined number of overhead data bytes, storing a further said predetermined number of said overhead data bytes of said group respectively into the associated storage locations.

22. The apparatus of claim 20, wherein said SONET frames are OC-192 frames.

23. The apparatus of claim 20, wherein said first data format is a time division multiplexed data format.

24. The apparatus of claim 23, wherein said SONET frames are OC-192 frames, and wherein said time division multiplexed data format is OC-768.

25. The apparatus of claim 24, wherein said predetermined number is 64.

26. The apparatus of claim 24, wherein, in said second data format, said groups of overhead data bytes that respectively correspond to OC-192 frames are arranged in parallel with one another.

27. The apparatus of claim 23, wherein, in said second data format, said groups of overhead data bytes are arranged in parallel with one another.

28. The apparatus of claim 20, wherein, in said first data format, respective portions of said groups of overhead data bytes are time division multiplexed with one another.

29. The apparatus of claim 28, wherein each of said portions consists of said predetermined number of bytes.

30. The apparatus of claim 20, wherein, in said second data format, said groups of overhead data bytes are arranged in parallel with one another.

31. The apparatus of claim 20, wherein, in said first data format, said groups of overhead data bytes are arranged in parallel with one another.

32. The apparatus of claim 31, wherein said second data format is a time division multiplexed data format.

33. The apparatus of claim 32, wherein said SONET frames are OC-192 frames, and wherein said time division multiplexed data format is OC-768.

34. The apparatus of claim 33, wherein said predetermined number is 64.

35. The apparatus of claim 33, wherein, in said second data format, said groups of overhead data bytes that respectively correspond to OC-192 frames are arranged in parallel with one another.

36. The apparatus of claim 20, wherein said second data format is a time division multiplexed data format.

37. The apparatus of claim 20, wherein, in said first data format, respective portions of said groups of overhead data bytes are time division multiplexed with one another.

38. The apparatus of claim 37, wherein each of said portions consists of said predetermined number of bytes.

39. The apparatus of claim 20, wherein said memory includes a FIFO memory.

40. The apparatus of claim 39, wherein said FIFO memory includes only said predetermined number of storage locations.

41. The apparatus of claim 21, wherein said memory includes a plurality of FIFO memories which respectively correspond to said groups, each of said FIFO memories including only said predetermined number of storage locations associated with the group to which said FIFO memory corresponds.

42. An apparatus for processing overhead data bytes from SONET data frames, comprising:

an input for receiving during a predetermined period of time a data frame having a first data format, said data frame comprising a plurality of groups of overhead data bytes, each said group carrying overhead information associated only with a respectively corresponding one of a plurality of SONET data frames;

a converter coupled to said input for converting, while said data frame is received, said plurality of groups of overhead data bytes from said first data format into a second data format, said converter including a memory having a plurality of storage locations, said memory operable with respect to one of said groups for storing a predetermined number of said overhead data bytes of said one group respectively into a number of said storage locations equal to said predetermined number, said memory for outputting said predetermined number of overhead data bytes from said predetermined number of storage locations, and said memory further operable, after having output said predetermined number of overhead data bytes, for storing a further said predetermined number of said overhead data bytes of said one group respectively into said predetermined number of storage locations;

an overhead processor coupled to said converter for receiving said groups of overhead data bytes arranged in said second data format and for processing said groups to produce corresponding groups of processed overhead data bytes arranged in said second format; and a further converter coupled to said overhead processor for converting said groups of processed overhead data bytes from said second data format into said first data format, said further converter including a further memory having a further plurality of storage locations, said further memory operable with respect to one of said groups of processed overhead data bytes for storing a predetermined number of said processed overhead data bytes of said one group respectively into a number of said further storage locations equal to said predetermined number of said processed overhead data bytes, said further memory for outputting said predetermined number of processed overhead data bytes from said number of said further storage locations and said further memory operable, after having output said predetermined number of processed overhead data bytes, for storing a further said predetermined number of said processed overhead data bytes of said one group respectively into said number of said further storage locations.

* * * * *